(12) United States Patent
Jönsson et al.

(10) Patent No.: US 9,249,884 B2
(45) Date of Patent: Feb. 2, 2016

(54) PRESSURE RESISTANT STATIC AND DYNAMIC SEAL ASSEMBLY AND METHOD

(71) Applicants: Sven Anders Jönsson, Stehag (SE); Yefim Epshetsky, Schaumburg, IL (US); Bryan Uncapher, Grayslake, IL (US)

(72) Inventors: Sven Anders Jönsson, Stehag (SE); Yefim Epshetsky, Schaumburg, IL (US); Bryan Uncapher, Grayslake, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 61 days.

(21) Appl. No.: 14/366,940

(22) PCT Filed: Dec. 14, 2012

(86) PCT No.: PCT/US2012/069719
§ 371 (c)(1),
(2) Date: Jun. 19, 2014

(87) PCT Pub. No.: WO2013/096115
PCT Pub. Date: Jun. 27, 2013

(65) Prior Publication Data
US 2014/0361490 A1    Dec. 11, 2014

Related U.S. Application Data

(60) Provisional application No. 61/577,431, filed on Dec. 19, 2011.

(51) Int. Cl.
*F16J 15/44* (2006.01)
*F16J 15/34* (2006.01)
*F16J 15/16* (2006.01)

(52) U.S. Cl.
CPC ............ *F16J 15/3404* (2013.01); *F16J 15/164* (2013.01); *F16J 15/44* (2013.01)

(58) Field of Classification Search
CPC .......... F16J 15/44; F16J 15/441; F16J 15/443; F16J 15/445; F16J 15/164
See application file for complete search history.

(56) References Cited

U.S. PATENT DOCUMENTS

| 3,797,899 A | * | 3/1974 | Anderson | F16C 33/7889 277/433 |
|---|---|---|---|---|
| 4,817,966 A | * | 4/1989 | Borowski | F16J 15/164 277/366 |
| 5,378,000 A | * | 1/1995 | Orlowski | F16J 15/164 277/311 |
| 2001/0002742 A1 | * | 6/2001 | Orlowski | F16J 15/4478 277/361 |
| 2006/0091612 A1 | * | 5/2006 | Anderberg | F16J 15/002 277/411 |
| 2014/0001707 A1 | * | 1/2014 | Epshetsky | F16J 15/164 277/433 |

\* cited by examiner

*Primary Examiner* — Gilbert Lee
(74) *Attorney, Agent, or Firm* — Mark Ussai; SKF USA Inc. Patent Dept.

(57) ABSTRACT

A shaft sealing assembly for static and dynamic sealing includes a stator member attached to a housing and a rotor member attached to a shaft rotatable about an axis. The rotor member includes first and second pocket sections extending from upper and lower radial flanges extending in a cantilevered fashion from a tubular member. At least one static sealing member is attached to and encapsulates each pocket section. Each static sealing member presents a core portion and a pair of radial lips extending from the core portion. The stator member presents an annular wall extending to inner walls inclined conically to a central radial rim or flange separating two pocket portions and the static sealing members presenting a contact and frictionally engaging with the central radial rim as the rotor member is at a stand-still or static position.

28 Claims, 4 Drawing Sheets

PRESSURE RESISTANT STATIC AND DYNAMIC SEAL ASSEMBLY AND METHOD

FIELD OF THE INVENTION

The present invention relates to seal assemblies, and more specifically to the seal assemblies with sealing members movable between static and dynamic sealing positions.

BACKGROUND OF THE INVENTION

Bearings and mechanical seals have been used in various industrial applications for years. A bearing isolator is one of the components of these bearings and mechanical seals. There is a close relationship between the life of these two critical components. The failure of a mechanical seal may cause the bearings to fail and poor bearing conditions can reduce seal life. The failure of the mechanical seal results typically because of rain, product leakage, debris, and wash-down water entering the bearing housing thereby resulting in contamination of bearing lubricant, which negatively impacts lifespan of the bearings and mechanical seals.

Elastomeric lips and O-rings are used in the mechanical seals to prevent rain, product leakage, debris, and wash-down water from entering into the bearing housing of these mechanical seals thereby avoiding quick wear and tear of these elastomeric lips and the O-rings. In reality, it is very hard and almost impossible to prevent dust and exterior contaminants from entering into the interior of the bearing housing. To prevent the ingress of corruption and the egress of lubricating fluids, a number of auxiliary or improved primary sealing arrangements and devices have been provided and used in prior art sealing applications.

One such type of a seal assembly, commonly referred to as an expeller seal assembly, includes two annular, elastomeric sealing members disposed within separate annular cavities of a rotor mounted on a shaft. A stator is partially disposed between the two rotor cavities and has a central bore which defines a clearance space about the shaft. At a static sealing position, each sealing member is disposed generally against a rotor outer circumferential surface and against an adjacent radial surface on each axial end of the stator, such that the clearance space is substantially sealed at each end. When the shaft rotates, the two sealing members are pulled by frictional engagement with the rotor surface to rotate with the shaft, until centrifugal forces cause each sealing member to deflect radially outwardly from the rotor outer surface and from the stator surface. At this point, sealing in the clearance space is accomplished by a pressure differential generated by the rotation of the rotor, and the disengagement of the seal from the stator both reduces wear on the sealing members and reduces friction in the seal assembly.

However, until the rotor and sealing members reach a rotational speed sufficient to deflect the sealing members into contact with an inner circumferential surface of the rotor, such that the sealing members are again rotationally coupled with the rotor, the sealing members will lose angular momentum and deflect inwardly due to the diminished centrifugal force and return to the inner, static sealing position.

Thus, the sealing members will oscillate between the inner, static sealing position and a non-contact position until reaching a sufficient "hold-off" speed at which the sealing members remain rotationally coupled with the rotor. Also, whenever the shaft speed decreases below the hold-off speed, the sealing members will again begin to oscillate into and out of contact with the stator. As such, this oscillatory motion of the sealing members tends to increase wear and increase friction within the seal assembly.

Another type of seal is a labyrinth device which contains a tortuous path that makes it difficult for contaminants to enter the bearing housing to degrade lubricant effectiveness. The advantages of labyrinths are their non-wearing and self-venting features. Some of these commercially successful seal devices do not require any actual physical inter engagement of the sealing member parts. The disadvantages of labyrinth seal devices include higher initial costs than lip seals, and the existence of an open path to the atmosphere that can allow the contamination of the lubricant by atmospheric condensate as the housing chamber breathes during temperature fluctuations in humid environments when the equipment cycles on and off.

Therefore, an opportunity exists for improved bearing isolators having a seal member with improved life span and a unique design that will allow smaller particles or contaminants and fluids to be expelled from gaps defined between the rotor member and the stator member the same way as they entered by the expelling function of the pumping action in dynamic operations but are stopped by the sealing member when the bearing isolator is in a static condition.

Still another opportunity exists for improved bearing isolators having a seal member wherein the function and shape of the seal member can be controlled whether the rotor member and the stator member are rotatable relative one another or not.

SUMMARY OF THE INVENTION

An apparatus of the present invention presents a shaft sealing assembly (the assembly) for static and dynamic sealing in various bearing and mechanical sealing applications. The assembly includes a stator member that is attached to a housing and a rotor member that is attached to a shaft rotatable about an axis. The rotor member includes a first expeller member presenting a plurality of radial protrusions separated by a plurality of recesses and a second expeller member attached to the shaft. The second expeller member includes first and second pocket sections extending from upper and lower radial flanges extending in a cantilevered fashion from a tubular member. Each pocket section includes an inlet defined therethrough.

At least one static sealing member is attached to and encapsulates each pocket section. Each static sealing member presents a core portion and a pair of radial lips extending from the core portion with one of the lips extending from one distal end of the core portion wherein another distal end terminates into a third lip. The stator member presents an annular wall extending to inner walls inclined conically to a central radial rim or flange separating two pocket portions and the static sealing members presenting a contact and frictionally engaging with the central radial rim as the rotor member is at a stand-still or static position.

At least one electromagnet is attached to the stator member on a certain distance from one of the distal ends of the static sealing member. At specific time before, at the moment or after the shaft starts to rotate the static sealing members are activated and moved away from the rotor member by the magnetic force created on the static sealing member by the electromagnet. The electromagnet is controlled by an existing control system for controlling any type equipment in which bearing isolator is used. If the static sealing member needs to be deactivated at or after the moment the shafts starts to rotate, the bearing isolator could have its own control system where a sensor is used to indicate if the shaft is rotating or not. The sensor could be placed outside or inside the bearing isolator.

Fluid passages are defined between the rotor member and the stator member designed with an angle and rotor features that create a pumping action. These fluid passages stop larger contaminants to enter and pass the assembly in dynamic and static operation. Smaller particles or contaminants and fluids are expelled from the fluid passages the same way as they entered by the expelling function of the pumping action in dynamic operations. In static conditions fluid and contaminants could enter the fluid passages but are stopped by the static sealing member.

As soon as the shaft starts to rotate, the contaminants are expelled out through the fluid passages. The free end or the third lip of the static sealing member, as it is in static conditions, contacts with an angled or inclined surface of the central rim of the stator member but a gap is created in dynamic conditions, as the shaft starts to rotate thereby inclining the third lip toward the stator member and disengaging the third lip from the central rim of the stator member.

An advantage of the present invention is to provide the improved shaft sealing assembly for static and dynamic sealing of the shaft system thereby replacing prior art bearing isolators having static sealing members like O-rings that are activated only by centrifugal force during acceleration and placed in the rotor.

Another advantage of the present invention is to provide an improved static sealing member placed in the stator member of the bearing isolator, wherein the static sealing member is made of magnetic rubber compound adaptable to become deactivated and activated by an electromagnet placed in the stator member and controlled by an external control system.

Still another advantage of the present invention is to provide an improved static sealing member wherein any undesired periods of contact between the stator member and the static sealing member can be regulated therefore extending the bearing isolator life.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
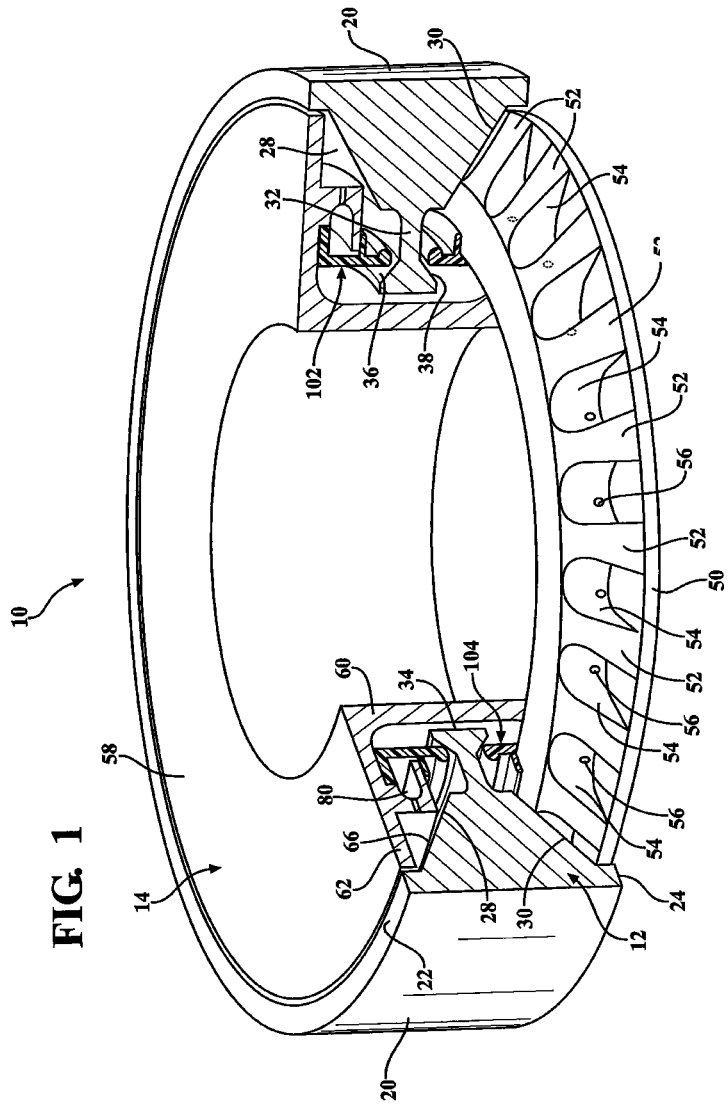
FIG. 1 illustrates a perspective and partially in section view of a shaft sealing assembly for static and dynamic sealing of a shaft of the present invention.

Referring to FIGS. 1 through 3, and 5, wherein like numerals indicate like or corresponding parts throughout the several views, a shaft sealing assembly (the assembly) for static and dynamic sealing of a shaft of the present invention is generally shown at 10. The words "inner", "inwardly" and "outer", "outwardly" refer to directions toward and away from, respectively, a designated centerline or a geometric center of an element being described, the particular meaning being readily apparent from the context of the description. The assembly 10 has numerous applications including and not limited to sealing vehicular engine crankshafts, transmission shafts, bearing lubrication systems, compressor shaft support assemblies, and the like, without limiting the scope of the present invention.

The assembly 10 is used for static and dynamic sealing applications in various bearings and mechanical sealing solutions. The assembly 10 includes of a stator member, generally indicated at 12, that is attached to a housing or any other worksurface (not shown) and a rotor member, generally indicated at 14, attached to a shaft 16 rotatable about an axis A. The stator member 12 presents an annular wall 20 extending to upper and lower side walls 22 and 24 and further inclined outwardly from the annular wall 20 to form inclined walls 28 and 30 and further extending into a radial rim or flange 32 extending generally perpendicular to the annular wall 20. The radial rim 32 is terminated into inner edge 34 extending parallel to the annular wall 22 and the axis A. The radial rim 32 is adjacent the rotor member 14. The radial rim 32 presents inclined surfaces 36 and 38 extending outwardly from the radial rim 32. The radial rim 32 presents a terminal portion 40. The stator member 12 may also include a groove (not illustrated) defined therein to receive an O-ring or seal (not illustrated) disposed therein to seal the stator member 12 against the housing or the worksurface. The stator member 12 is formed from metals, metals alloys, or any other rigid material without limiting scope of the present invention. The stator member 12 can be stamped or injection molded.

The rotor member 14 includes a first expeller rotor 50 presenting a plurality of radial protrusions 52 separated by a plurality of recesses 54 and inlets 56 defined therein and extending through the first expeller 50. A second expeller rotor 58 is attached to the shaft 16. The second expeller rotor 58 include a tubular body 60 having upper and lower radial flanges 62 and 64. The upper and lower radial flanges 62 and 64 include inclined walls 66 and 68 extending parallel the inclined walls 28 and 30 thereby forming fluid passages 70 and 72. The upper and lower radial flanges 62 and 64 further include first and second pocket sections 80 and 82 extending from the upper and lower radial flanges 62 and 64. Each pocket section 80 and 82 includes inlets 84 and 86 defined therethrough and exposed to the fluid passages 70 and 72. Each pocket sections 80 and 82 present step portions 90 and 92 defined between the respective pocket portions 80 and 82 and the upper and lower radial flanges 62 and 64. The rotor member 14 is formed from metals, metals alloys, or any other rigid material without limiting scope of the present invention. The rotor member 14 can be stamped or injection molded.

Figure 2:
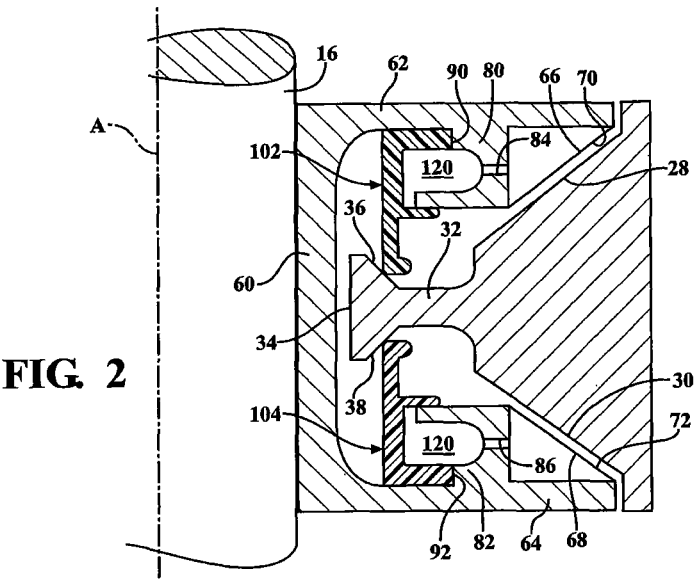
FIG. 2 illustrates an enlarged cross sectional view of the embodiment of the shaft sealing assembly for static and dynamic sealing of the shaft of FIG. 1.
Figure 3:
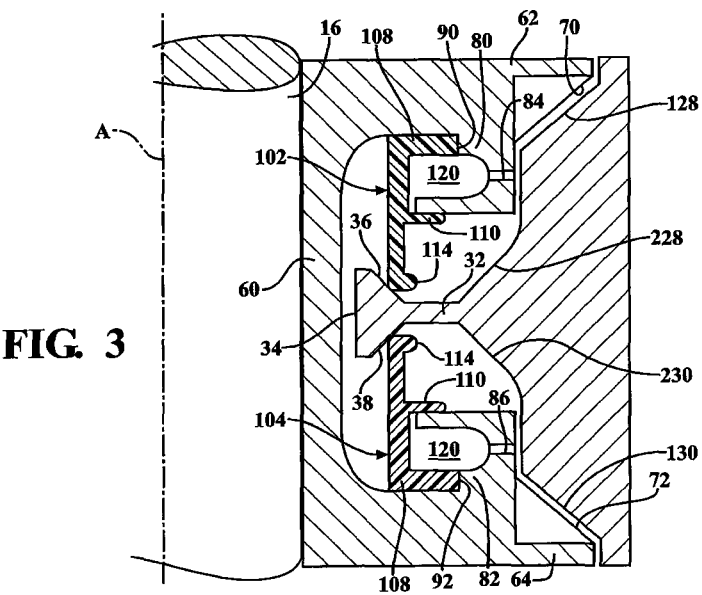
FIG. 3 illustrates an enlarged cross sectional view of alternative embodiment of the shaft sealing assembly for static and dynamic sealing of the shaft of FIG. 1.

At least one electromagnet device 94 is attached to the stator member 12. The electromagnet device 94 is controlled by an existing control system 96 for controlling any type equipment in which the assembly 10 is used. A bearing isolator (not shown) could have its own control system (not illustrated) where a sensor 100 is used to indicate if the shaft 16 is rotating or not. The sensor 100 could be placed outside or inside the bearing isolator. FIGS. 1 through 3 show a schematic location of the sensor 100 and are not intended to limit the scope of the present invention.

A pair of static sealing members, generally indicated at 102 and 104, are attached to and encapsulate each pocket section 80 and 82. Each static sealing member 102 and 104 presents a core portion 106 and a pair of radial lips 108 and 110 extending radially from the core portion 106 with one of the lips 108 extending from one distal end of the core portion 106 wherein another distal end 112 terminates into a third lip 114. The static sealing members 102 and 104 are formed from resilient elastomeric materials with metal particles or powder mixed therein. In particular, the elastomeric material is made of magnetic rubber compound adaptable to become deactivated and activated by the electromagnet device 94 placed in the stator member 12 and controlled by the external control system.

Alternatively, the static sealing members 102 and 104 are formed from resilient elastomeric materials without metal particles or powder mixed therein thereby moving between the static position and the dynamic position as the rotor member 14 rotates about the stator member 12 thereby moving the static sealing members 102 and 104 under effect of centrifugal force generated during rotation of the rotor member 14. The radial rim 32 of the stator member 12 extends between the two pocket portions 80 and 82 and the static sealing members 102 and 104 presenting a contact and frictionally engaging with the central radial rim 32 at the inclined surfaces 42 and 44 as the rotor member 14 is at stand-still or static position.

At least one electromagnet device 94 is attached to the stator member 12 on a certain distance from one of the distal ends 114 of the static sealing members 102 and 104. At specific time before, at the moment or after the shaft 16 starts to rotate the static sealing members 102 and 104 are activated and moved away from the rotor member 14 by the magnetic force created on the static sealing members 102 and 104 by the electromagnet device 94. If the static sealing members 102 and 104 need to be deactivated at or after the moment the shaft 16 starts to rotate, the bearing isolator could have its own control system where the sensor 100 is used to indicate if the shaft 16 is rotating or not.

Figure 4:
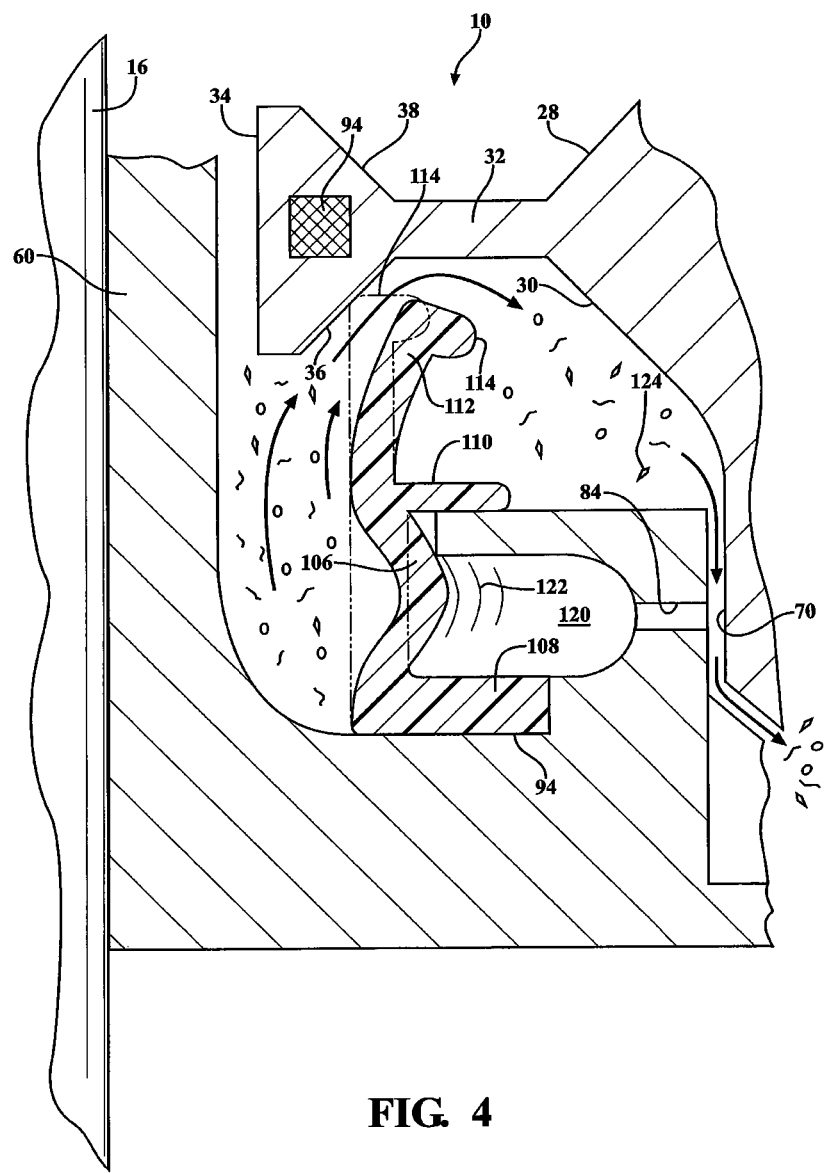
FIG. 4 illustrates a partially enlarged cross sectional view of a second expeller rotor member with a sealing member connected thereto wherein the sealing member moves between a first position, shown in phantom, is the sealing member is in its static stage, and a second position as the sealing member moves away.
Figure 5:
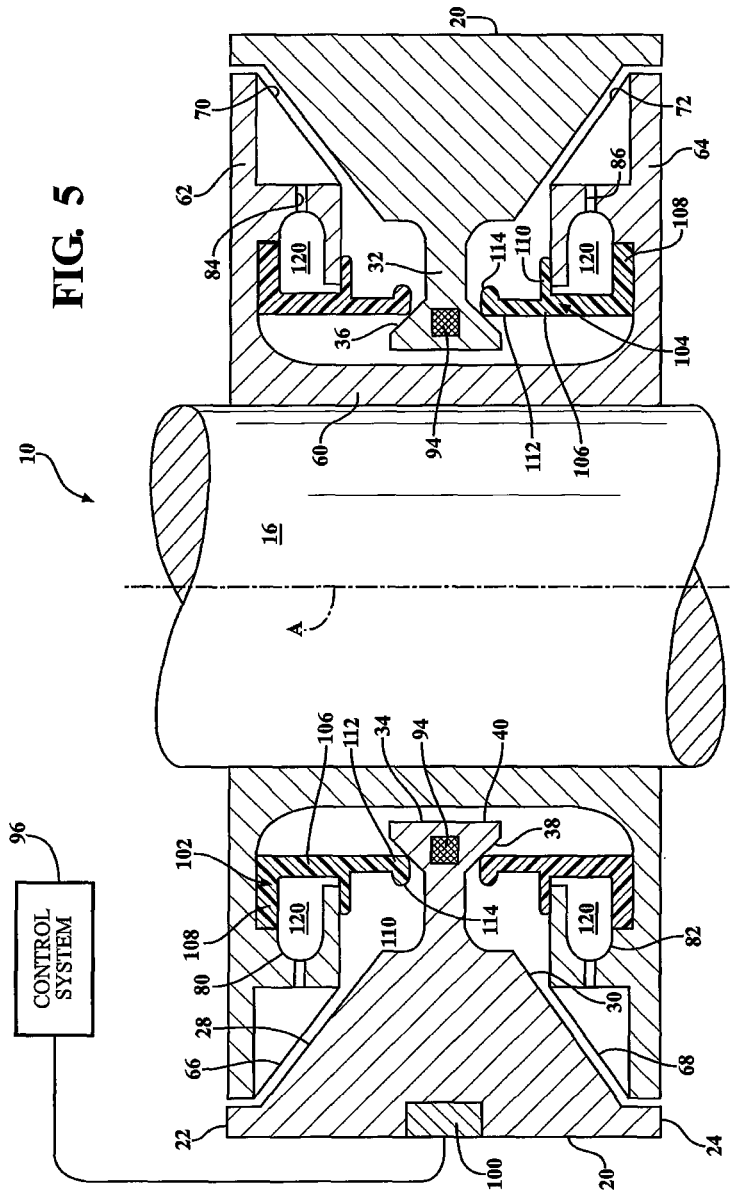
FIG. 5 illustrates another cross sectional view of the shaft sealing assembly for static and dynamic sealing of the shaft shown in FIG. 1.

As best shown in FIG. 4, vacuum is created in the chamber 120 defined by the pocket portions 80 and 82 encapsulated by the static sealing members 102 and 104, respectively. The vacuum is created via ports or the inlets 84 and 86 connecting the chamber 120 to the fluid passages 70 and 72 between the rotor member 14 and the stator member 12. The static sealing members 102 and 104 change in shape as the shaft 16 starts to rotate about the axis A.

During rotational motion of the shaft 12, the vacuum is created in the chamber 120 thereby sucking, as shown at 122, the core portion 106 of the static sealing lip 102 and 104 due to suctioning created during centrifugal force as the rotor member 14 rotates about the stator member 12. As the rotor member 14 continues rotational motion, centrifugal force as applied to the core member 106 at its distal ends 112 of each of the static sealing members 102 and 104 forces the distal ends 112 away from the inclined surfaces 36 and 38 thereby immediately creating a gap, as shown in FIG. 4, when the vacuum is expanding the other end of the static sealing members 102 and 104 and thus decrease the overall width and length of the static sealing function.

As best shown in FIGS. 1 through 3, and 5, these two static sealing members 102 and 104 that are in contact with the stator member 14 at stand-still position, as also shown in phantom in FIG. 4, but when the shaft 16 starts to rotate the static sealing members 102 and 104 are activated and moved away from the stator member 12, as best shown in FIG. 4. The static sealing members 102 and 104 are never rotating relative the rotor member 14 and are facing each other. The fluid passages 70 and 72 defined between the rotor member 14 and the stator member 12 stop larger contaminants to enter and pass the seal in dynamic and static operation. As best illustrated in FIG. 4, smaller particles, contaminants, and fluids, as shown at 124, are expelled from the fluid passages 70 and 72 the same way they entered by the expelling function of the pumping action in dynamic operations. In static conditions fluid and contaminants 124 could enter the fluid passages 70 and 72 but are stopped by the static sealing members 102 and 104. As soon as the shaft 16 starts to rotate, the contaminants 124 are expelled out through the fluid passages 70 and 72.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A seal assembly functionally interposed between a housing and a shaft rotatable about an axis and extending through the housing for providing a seal between the shaft and the housing, said seal assembly comprising:
   a stator member attached to the housing;
   a rotor member attached to the shaft and rotatable about the axis with the shaft and relative said stator member defining fluid passages therebetween; and
   at least one sealing member connected to said rotor member to define enclosed pocket portions fluidly communicated with said fluid passages with said at least one sealing member deforming between a static position as said at least one sealing member frictionally engages said stator member thereby creating a closed area defined between said rotor member and said stator member and a dynamic position as said rotor member rotates about the axis thereby creating vacuum inside said enclosed pocket portions with said at least one sealing member disengaging from said stator member and moving away from said rotor member partially extending into said enclosed pocket portions in response to vacuum formed during rotation of said rotor member thereby allowing contaminants to escape the closed area and leave said seal assembly through said fluid passages.

2. A seal assembly as set forth in claim 1, wherein there are two sealing members.

3. A seal assembly as set forth in claim 2, wherein each of said sealing member presents a core portion and a pair of radial lips extending radially from said core portion with one of said lips extending from one distal end of said core portion and another distal end terminating into a third lip.

4. A seal assembly as set forth in claim 3, wherein said sealing members are formed from resilient elastomeric materials.

5. A seal assembly as set forth in claim 4, wherein said stator member presents an annular wall extending to upper and lower side walls and further inclined outwardly from said annular wall to form inclined walls and further extending into a radial flange extending generally perpendicular to said annular wall.

6. A seal assembly as set forth in claim 4, wherein said radial flange is terminated into inner edge extending parallel to said annular wall and an axis (A) of the seal assembly.

7. A seal assembly as set forth in claim 6, wherein said radial flange presents a terminal portion having inclined surfaces.

8. A seal assembly as set forth in claim 7, wherein said rotor member includes a first expeller rotor presenting a plurality of radial protrusions separated by a plurality of recesses and inlets defined therein and extending through said first expeller.

9. A seal assembly as set forth in claim 8, including a second expeller rotor attached to the shaft and presenting a tubular body having upper and lower radial flanges including inclined walls extending parallel said inclined walls of said stator member thereby forming said fluid passages.

10. A seal assembly as set forth in claim 9, wherein said upper and lower radial flanges further include said pocket portions extending from said upper and lower radial flanges wherein each said pocket portion includes inlets defined therethrough and exposed to said fluid passages.

11. A seal assembly as set forth in claim 10, wherein each pocket portion presents a step portion defined between said pocket portions and said upper and lower radial flanges to receive one of said radial lips of said sealing members.

12. A seal assembly as set forth in claim 11, including at least one electromagnet device connected to at least one of said stator member and said rotor member.

13. A seal assembly functionally interposed between a housing and a shaft rotatable about an axis and extending through the housing for providing a seal between the shaft and the housing, said seal assembly comprising:
a stator member attached to the housing and presenting an annular wall extending to upper and lower side walls and further inclined outwardly from said annular wall to form inclined walls and further extending into a radial flange extending generally perpendicular to said annular wall;
a rotor member attached to the shaft and rotatable about the axis with the shaft and relative said stator member defining fluid passages therebetween with said rotor member presenting a tubular body having upper and lower radial flanges including inclined walls extending parallel said inclined walls of said stator member thereby presenting pocket portions extending from said upper and lower radial flanges wherein each said pocket portion includes inlets defined therethrough and exposed to said fluid passages; and
at least one sealing member presenting a core portion and a pair of radial lips extending radially from said core portion with one of said radial lips extending from one distal end of said core portion and another distal end terminating into a third lip with said at least one sealing member connected to said rotor member to enclose said pocket portions fluidly communicated with said fluid passages with said at least one sealing member deforming between a static position as said at least one sealing member frictionally engages said stator member thereby creating a closed area defined between said rotor member and said stator member and a dynamic position as said rotor member rotates about the axis thereby creating vacuum inside said pocket portions with said at least one sealing member disengaging from said stator member and moving away from said rotor member with said at least one sealing member partially extending into said pocket portions in response to vacuum formed during rotation of said rotor member thereby allowing contaminants to escape the closed area and leave said seal assembly through said fluid passages.

14. A seal assembly as set forth in claim 13, wherein there are two sealing members.

15. A seal assembly as set forth in claim 14, wherein said sealing member is formed from resilient elastomeric material.

16. A seal assembly as set forth in claim 15, wherein said radial flange is terminated into inner edge extending parallel to said annular wall and an axis (A) of the seal assembly and presenting a terminal portion having inclined surfaces.

17. A seal assembly as set forth in claim 16, wherein said rotor member further includes a second expeller rotor presenting a plurality of radial protrusions separated by a plurality of recesses and inlets defined therein and extending through said first expeller rotor.

18. A seal assembly as set forth in claim 17, including at least one electromagnet device connected to at least one of said stator member and said rotor member.

19. A method of forming a pressure resistant static and dynamic seal interposed between a housing and a shaft rotatable about an axis and extending through the housing, said method comprising the steps of:
connecting a stator member attached to the housing with a rotor member attached to the shaft to define fluid passages therebetween;
rotating the rotor member about the axis with the shaft and relative the stator member; and
connecting at least one sealing member to the rotor member to define an enclosed pocket portion fluidly communicated with the fluid passages to deform the at least one sealing member between a static position as the at least one sealing member frictionally engages the stator member to create a closed area between the rotor member and the stator member and a dynamic position as the rotor member rotates about the axis to create vacuum inside the pocket portion and disengaging from the stator member by partially extending into the pocket portion in response to vacuum formed during rotation of the rotor member to allow contaminants to escape the closed area through the fluid passages.

20. A method as set forth in claim 19, including the step of connecting two of sealing members to the rotor member.

21. A method as set forth in claim 20, including the step of forming each sealing member to define a core portion and a pair of radial lips extending radially from the core portion with one of the lips extending from one distal end of the core portion and another distal end terminating into a third lip.

22. A method as set forth in claim 21, including the step of forming the sealing members from resilient elastomeric materials.

23. A method as set forth in claim 22, including the step of forming the stator member presenting an annular wall extending to upper and lower side walls and further inclined outwardly from the annular wall to form inclined walls and further extending into a radial flange extending generally perpendicular to the annular wall.

24. A method as set forth in claim 23, including the step of forming the radial flange terminated into inner edge extending parallel to the annular wall and an axis (A) of the seal assembly presenting a terminal portion having inclined surfaces.

25. A method as set forth in claim 24, including the step of forming the rotor member includes a first expeller rotor presenting a plurality of radial protrusions separated by a plurality of recesses and inlets defined therein and extending through the first expeller.

26. A method as set forth in claim 25, including the step of forming a second expeller rotor attached to the shaft and presenting a tubular body having upper and lower radial flanges including inclined walls extending parallel the inclined walls of the stator member thereby forming the fluid passages.

27. A method as set forth in claim 26, including the step of forming the pocket portions in the upper and lower radial flanges includes inlets defined therethrough and exposed to the fluid passages.

28. A method as set forth in claim 27, including the step of connecting at least one electromagnet device to at least one of the stator member and the rotor member.

\* \* \* \* \*